United States Patent [19]
Calkin et al.

[11] 3,850,599
[45] Nov. 26, 1974

[54] MEANS FOR SEPARATING ENTRAINED LIQUID

[75] Inventors: Billy C. Calkin; Neely E. Lowrie, both of Tulsa, Okla.

[73] Assignee: Combustion Engineering Inc., New York, N.Y.

[22] Filed: Sept. 24, 1973

[21] Appl. No.: 399,903

[52] U.S. Cl. ................................ 55/440, 55/481
[51] Int. Cl. ............................................. B01d 45/08
[58] Field of Search ............. 55/185, 174, 186, 481, 55/440, 466; 210/521

[56] References Cited
UNITED STATES PATENTS
1,890,294  12/1932  Hughes ................................ 55/436
2,001,259  5/1935  Lucke .................................. 55/466
3,477,208  11/1969  Keller Sr. ............................. 55/434
3,626,673  12/1971  Stockton et al. ...................... 55/434
3,757,498  9/1973  Huribut ................................ 55/440

Primary Examiner—Bernard Nozick
Attorney, Agent, or Firm—Arthur L. Wade

[57] ABSTRACT

Parallel plates spaced to receive gaseous fluid with entrained liquid for their phase separation are assembled into modular cells in which the plates extend vertically. The cells are held by a framework in side-by-side orientation to form a unit extending transverse the flow path of the fluid mixture to be separated.

2 Claims, 3 Drawing Figures

MEANS FOR SEPARATING ENTRAINED LIQUID

BACKGROUND OF THE INVENTION

1. Field of the Invention

The present invention relates to mounting groups, or sections, of baffles designed to be contacted by liquid entrained in gas within a vessel through which the liquid and gas flows. More specifically, the invention relates to forming a framework across the gaseous flow path in a vessel within which modules, or sections, of the baffles are retained so that the liquids entrained in the gas impact upon the surfaces of the baffles and drain to a collection of liquid below the modules.

2. Description of the Prior Art

This invention represents the third stage in the development of a satisfactory modular construction for baffles mounted in oil and gas separators. The first generally recognized success in building an oil and gas separator with effective internal baffles is represented by the disclosure of U.S. Pat. No. 2,349,944 issued to P. C. Dixon, May 30, 1944. The teachings found in this patent have successfully guided the design of fluid separators for many years. The advantages of the parallel plate baffles of the Dixon invention within separators, to provide collecting surfaces for the liquids of a gas-liquid mixture, have been generally recognized.

The features of the Dixon plates were preserved while their cost per pound of weight was reduced under the teachings of U.S. Pat. No. 3,413,778 issued to Lavery et al Dec. 3, 1968. Aside from the evolution of form for separator plates, there developed a need for modular construction for selected numbers of the plates. The modular construction is necessary to facilitate fabrication, coating of the vessel, and removal for shipping, cleaning, service, repair and replacement of the plates.

The first modular construction for these plates was under the teachings of U.S. Pat. No. 3,626,673, issued to Stockton et al on Dec. 14, 1971. These teachings are sound, if limited. The modular concepts embodied in the disclosure of U.S. Pat. No. 3,626,673 are adaptable to both the simple, parallel, flat plates specifically disclosed in that patent and the serpentine plates of U.S. Pat. No. 3,413,778. However, the practical embodiment of these concepts are limited to orienting the parallel plates at 45° to the horizontal.

The invention embodied in the disclosure of U.S. Pat. No. 3,413,778 was given a sound commercial embodiment. However, the angle formed between the parallel sandwiching, flat plates cannot be greater than approximately 30° or the liquids collected in the valleys of the serpentine plates will not drain satisfactorily through the "scoop" interruptions. In view of the disclosure of both U.S. Pat. No. 3,413,778 and U.S. Pat. No. 3,626,673, there was obviously a need for a modular construction to provide at least the efficient angle required for operation of the serpentine plates.

The second modular construction for these plates was under the teachings of U.S. Patent Application SN 281,884, filed Aug. 18, 1972 by David M. Rennie now U.S. Pat. No. 3,795,091 issued 3/5/74. The principal object of this invention is to form a vertically elongated framework about a selected number of spaced, parallel plates mounted in a vessel as a modular cell which can be connected to similar cells in forming a unit. The cells are structured to retain the plates within the cell both parallel to each other and at any desired, predetermined angle to the horizontal. This construction, then, accommodates the serpentine plates of U.S. Pat. No. 3,413,778 and provides them the desired modular construction.

Since the filing of U.S. Patent Application SN 281,884 on Aug. 18, 1972, the impact separation has returned to popularity. Now, rather than pass the flow of gas and entrained liquids down columnar paths and establish non-turbulent flow in which the drops of entrained liquid fall upon, and wet, the plate beneath them, the path is made deliberately tortuous. The liquid drops are driven upon plate surfaces. This impact of liquid drops upon plate surfaces is included in the results obtained by the disclosure of U.S. Patent Application SN 313,223 filed Dec. 8, 1972 by Hill et al. This is now the way separation of entrained liquids from gas will be brought about. The third modular construction has been developed around this form of plate.

The impact plates of U.S. Patent Application SN 313,223 extend vertically. Horizontally, they form a serpentine path for the fluids between adjacent plates. While these vertical plates do not offer the challenge of mounting at the angle required of the first two modular constructions, they do have mounting problems of a particular nature.

SUMMARY OF THE INVENTION

A principal object of the invention is to form horizontal tracks at the upper and lower ends of vertically elongated impact separation plates as part of a complete frame for groups of the plates which together, on the tracks, form a unit transverse a flow path of gas and entrained liquids.

Another object is to structure the components of the unit so they can be inserted through a relatively small vessel opening for subsequent assembly at a desired position internal of the vessel.

Another object is to provide for liquid drainage of the framework to the liquids collected below the unit.

The present invention provides a number of cells comprised of spaced parallel plates connected together to receive gas with entrained liquids to be separated from the gas. A framework for the cells is provided, including at least one track to support the cells at their lower ends. Retaining structure at the sides and upper ends of the cells extend up from the lower track and complete the capture of the cells in the resulting framework.

The invention also provides the structure of the cells and components of their framework in a size and shape which will enable them to be inserted through a relatively small vessel opening for assembly within the vessel.

The invention also provides openings in the lower track and conduits extending from the openings downward to deliver liquid drained to the track downward to a lower collection of liquid, thereby completing the gas-liquid separation.

Other objects, advantages and features of this invention will become apparent to one skilled in the art upon consideration of the written specification, appended claims, and attached drawings, wherein;

DESCRIPTION OF THE PREFERRED EMBODIMENT OF THE INVENTION

Figure 1:
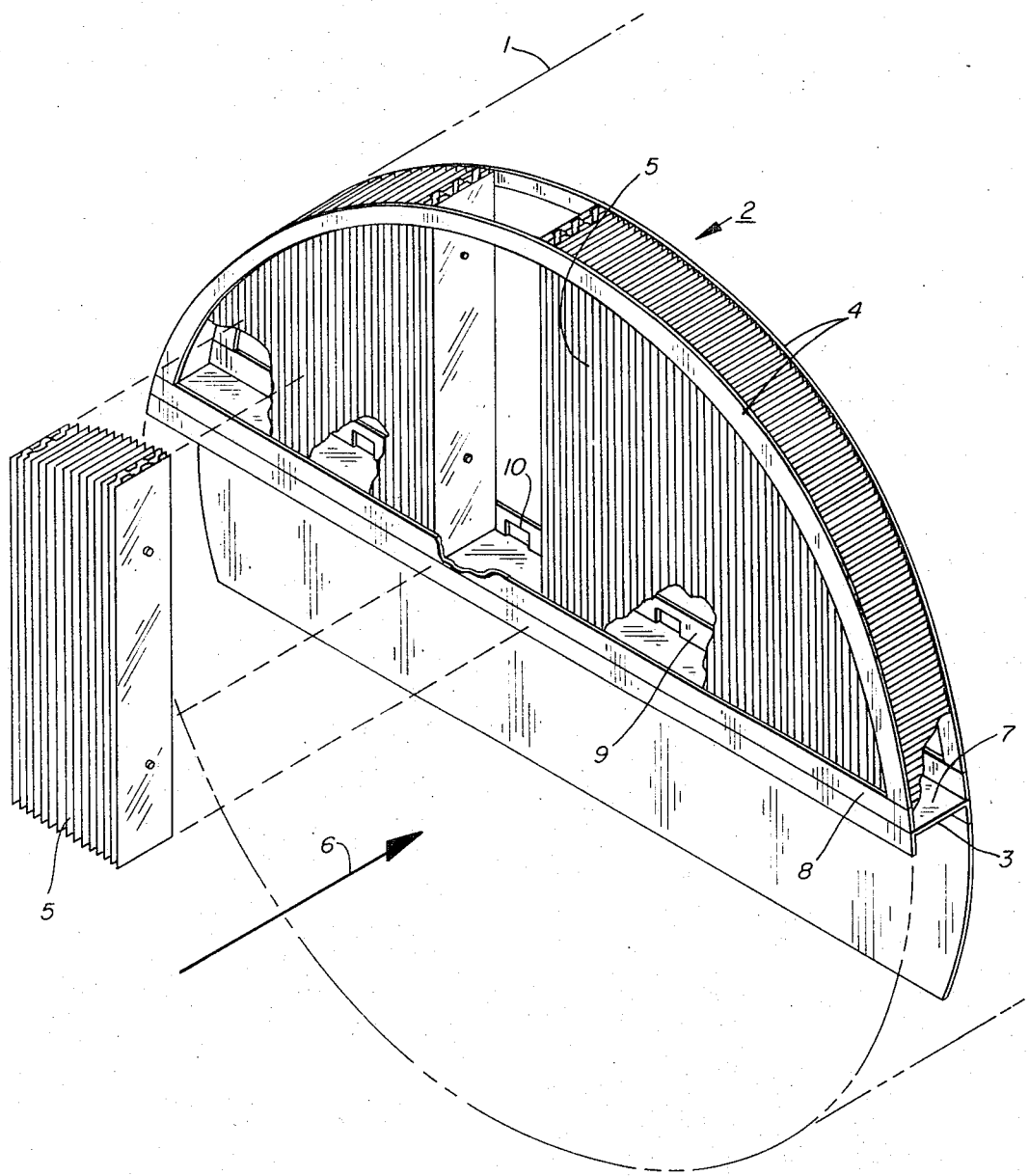
FIG. 1 is a perspective of a modular separator plate unit as mounted in a horizontal gas-oil separator and including the present invention.

Fluid separators for liquid and gas phases have been given adequate analysis in the disclosures of Lavery et al U.S. Pat. No. 3,413,778 and Stockton et al U.S. Pat. No. 3,626,673. Repetition of this material would be tedious and not facilitate disclosure of the present invention. Referring to FIG. 1, it is only necessary to point out that it discloses a modular construction of separator plates as they are mounted in a horizontal, elongated, separator shell, the inside wall of the separator being indicated at 1.

The separator plate unit 2, as positioned within the separator shell, extends upward from track 3 to the upper walls of its separator shell. Strips 4 extend from the ends of track 3 up along the wall of the separator to complete the framework for the modules 5.

The track 3 is supported from its ends by attachment to the walls of the separator shell. Strips 4 are attached to the ends of the track 3 and the walls of the shell. Within the framework formed by track and strips, the modules 5 are retained as a unit 2. So positioned, the modules are held as a unit in the flow stream of fluids. The liquid entrained in the gaseous fluid is caused to wet the plates, run down on the track and flow from the track into a collection below the unit-in the bottom of the shell.

The plates of modules 5 must be vertical to function efficiently. The form, vertical orientation and function of these modules are disclosed in the Hill et al application. The framework of track 3 and strips 4 was conceived as keeping the modules in the flow stream of fluids to be separated so their plates will be in the vertical orientation. How the plates are held together, how their modules are shaped on the ends of the unit to conform to the shell contour, how the unit is drained of its liquid separated from the gas these are important features of the concept. The basic concept remains. The horizontal rail and the side strips form the basic support for the modules of the unit. The other features are additive to the basic structure in attaining all the objects of the invention.

The horizontal track member 3 is mounted in shell 1 to extend transverse the flow path of fluids. Here the flow path is through the horizontal vessel shell as indicated by arrow 6. Whatever else, the track 3 provides a flat surface 7 which gives support to the modules 5.

Track member 3 is shown in the simple form of a channel. Although only the flat surface 7 is a direct supporting surface, the depending legs of the channel add strength to the member. Additional strength can be provided by a member such as an I-beam beneath the channel. Whatever the strength required and provided, flat surface 7 is the result-a support for the modules 5.

Strips 4 are connected directly to the ends of track member 3 and the internal walls of the vessel shell 1. Strips 8 and 9 are extended along the surface 7 to complete the framing of the modules 5. Of course, these structural members are expected to be of iron and they are conveniently connected together by welding.

Strip 9 is downstream of the flow of fluids through the modules 5. Liquid removed from gaseous fluids flows through modules 5 and gravitates down to surface 7. To drain this separated liquid from the framework, slots 10 are provided in strip 9. These slots, flush with surface 7, conduct the separated liquid out of the framework, from surface 7, down to the lower volume of shell 1. The collected liquids in the bottom of the shell 1 are then removed with structure having nothing to do with the invention.

Under this broad concept of the invention, frame members 3, 4, 8 and 9 support and retain the modules 5. The modules are shown in FIG. 1 as a unit of separator plates, vertically extended and connected to each other by connectors through the plates. As a unit, the modules have been placed in a jig which holds them while they are sawed to the circular contour of the upper walls of shell 1 above surface 7.

Surface 7 is fixed in place. One of the strips, 8 or 9, is welded to surface 7. The unit of modules 5 is placed on surface 7 and against the strip welded to surface 7 and a first of the strips 4. The second strip 4 is then welded to the vessel and the ends of track 3 and the other of the horizontal strips 8 or 9 to complete the framework. The unit of plates is thereby completely mounted and ready to function to remove liquid from gases.

What if the vessel shell is so large that the plates of the modules are too long After all, it is expected that the modules be small enough so they may be readily inserted through the usual manway in the wall of the vessel shell. In this circumstance, the invention is conceived as providing a frame for two sections of modules. One row of modules will be over the other row. Both rows will be integrated into a single frame structure. One of the first problems solved is draining the separated liquids from the upper row of modules without these liquids being re-entrained in gases flowing out of the lower row of modules.

Figure 2:
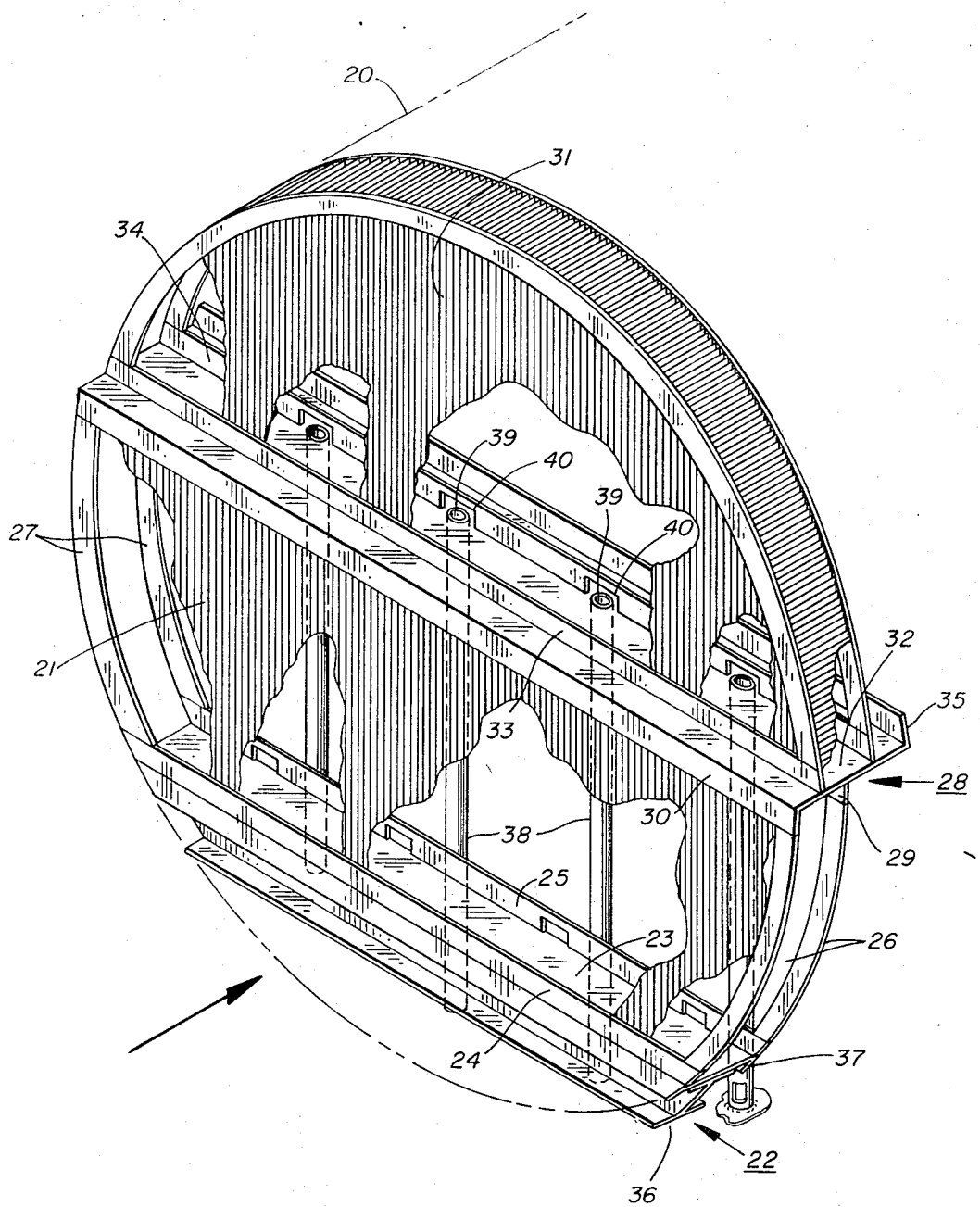
FIG. 2 is a perspective of a modulator separator plate unit in two horizontal sections which together form the complete unit in a horizontal gas-oil separator.

FIG. 2 is established to disclose this two-tier structure for the larger vessel shell 20. The lower row of modules 21, and their framework, is quite similar to the FIG. 1 modules structure. Track 22 provides a surface 23 bounded by strips 24, 25. Strips 26 and 27 extend up the sides of the shell 20. However, track 28 provides depending strips 29, 30 to the ends of which strips 26, 27 attach to complete the lower frame for modules 21.

The upper modules 31 are formed in a slight, downstream off-set from the lower modules. The track 28 provides surface 32 for the lower ends of modules 31. Strips 33, 34 are mounted on, or attached to, surface 32 to complete the upper frame.

Track 28 is fairly complicated. First, surface 32 extends in width from the front edge of the lower modules 21 to well beyond strip 34. This back, or downstream, end has an up-turned flange 35. Strips 29, 30 depend from this flat, horizontal base of the track to become the upper part of the frame for the lower modules. On the upper surface 32, the strips 33, 34 are mounted to off-set the upper modules 31 from the lower modules 21. This off-set is part of the arrangement providing the drainage system for liquid from the upper modules 31.

More specifically, track 22 is shown in FIG. 2 as comprised of I-beam 36 with channel 37 mounted on top of it. Surface 23 is the upper side of this channel 37 and supports the modules 21 at their lower ends as disclosed in FIG. 1. All of this framework for the lower modules 21 follows the teachings of the FIG. 1 disclosure.

However, track 28 is another matter. The support for modules 31 is provided with surface 32. But the drainage of liquids is down conduits 38. Openings 39 are provided through surface 32, in the middle of openings 40 in strip 34. The upper ends of conduits 38 register with openings 39. These conduits extend to the bottom of the vessel shell 20 and the liquids flowing down in them are isolated from the gas flowing through the modules 21 in the lower framework. Up-turned flange 35 retains liquids separated from the gas flowing through modules 31 and insures it is directed down conduits 38. Therefore, the liquids separated by modules 21 fall to the bottom of shell 20 through openings in strip 25 and the liquids separated by modules 31 fall to the bottom of shell 20 through conduits 38.

Figure 3:
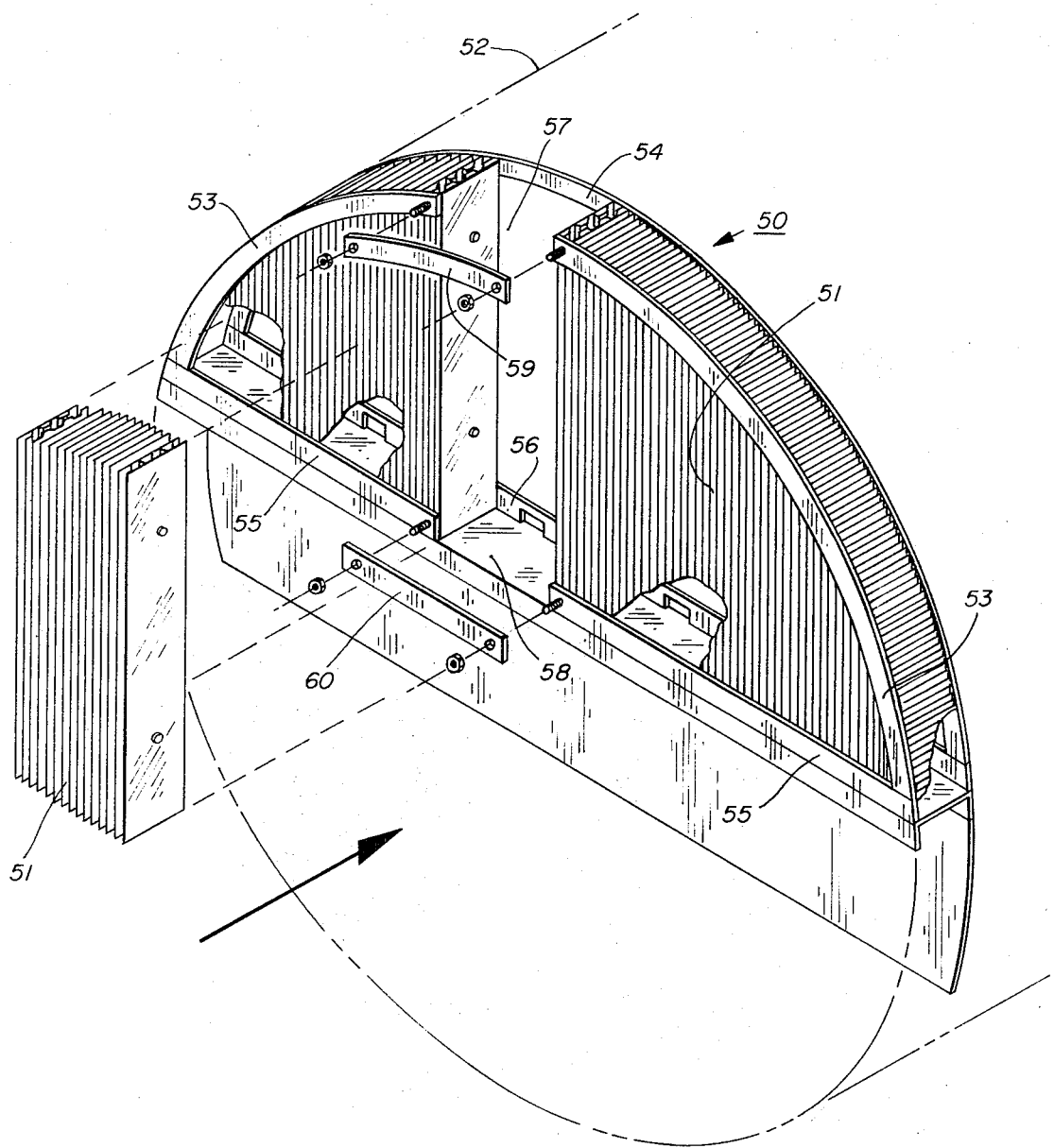
FIG. 3 is a perspective similar to FIG. 1 and modified to mount modules in the frame after the frame is completed.

FIG. 3 is similar to FIG. 1 in disclosing a plate separator unit 50 of modules 51 mounted in a framework of tank 52 and strips 53, 54, 55 and 56. Additionally, this FIG. 3 disclosure is arranged to mount and dismount modules 51 after installation of the framework in the vessel.

The arrangement is centered about openings in the strips of the framework through which the modules 51 are moved into, and out of, their positions in the framework. Specifically, opening 57 is formed in strip 53 and opening 58 is formed in strip 55. These openings are vertically aligned and sized to receive the modules 51 into the framework. Inserted through the strip openings, the modules 51 can then be moved down track 52 to their respective positions. After all modules are in place, and the assembly of modules is complete, retaining cover 59 is fastened over opening 57 and retaining cover 60 is fastened over opening 58. The framework is thereby completed and the unit of modules ready to receive the fluids for separation. Of course, the modules can be removed as readily by reversing the procedure.

CONCLUSION

This is not a tremendously exciting invention. On the other hand, it has contributed to the advance of an art serving a very useful purpose. The separation of oil and gas is well recognized in importance.

Structure within vessels to promote gas-liquid separation has been developed over the years. One line of this development has been outlined in the introduction to this application.

The plates that have been developed require support. This support is not always simple to provide with efficiency. When it has been required to mount the plates after the vessel has been fabricated and stress-relieved, the supports have offered a real challenge. The novelty of preceding support structure has been extended by this disclosure.

The track and strip combination embodying the present invention has met the challenge of mounting the new impact plates. Further, the problem of draining the plates and mounting and dismounting their modules after the framework is in place has been met.

From the foregoing, it will be seen that this invention is one well adapted to attain all of the ends and objects hereinabove set forth, together with other advantages which are obvious and inherent to the method.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

What is claimed is:

1. A unit including separator plates to be mounted in a horizontal vessel and in the horizontal flow path through the vessel in which entrained liquid of gases impact upon the plate surfaces to separate from the gases, including; a plurality of modules positioned side-by-side, each module comprising:
   a. a series of the plates which are parallel and vertically extended and spaced a predetermined distance apart, and
   b. means extending through the plate surfaces to maintain the plates spaced and parallel; a framework for the plurality of modules, comprising:
   a. a track member extending horizontal and transverse the flow path of fluids and in support of the lower end of the modules, and
   b. strips extending up from the ends of the track member along the walls of the vessel and along the sides and tops of the modules to completely capture the modules and retain them in the flow path of the fluids as a unit; conduits extending down through the horizontal track member to direct liquid flowed to the track from the modules to a collection of liquid below the unit; the modules adjacent the walls of the vessel being cut to match the curvature of the vessel walls and nest within the framework strips extending up from the ends of the track member; and the track is provided with an opening in its side through which each module may be first inserted and then moved horizontally along the track and into its final position within the framework.

2. A unit including separator plates to be mounted in a horizontal vessel and in the horizontal flow path through the vessel in which entrained liquids of gases impact upon the plate surfaces to separate from the gases, including;
   a plurality of modules positioned side-by-side, each module comprising a number of the plates vertically extended and supported in parallel a predetermined distance apart;
   a framework for the modules, comprising,
   a. at least two track members extending horizontal and transverse the fluid flow path and parallel each other, and
   b. strips extending up from the ends of the lower track member along the walls of the vessel and along the sides and tops of the modules to completely capture two rows of modules as one row extends from the upper surface of the lower track member to the lower surface of the upper track member and the second row extends from the upper surface of the upper track member to the strips above the upper track;

conduits extending down through the upper track member to direct liquid flowing from the track flowed to the track from the modules to a collection of liquid below the unit; and the tracks being each provided with openings in their sides through which each module may be first inserted and then moved horizontally along the track and into its final position within the framework.

* * * * *